UNITED STATES PATENT OFFICE.

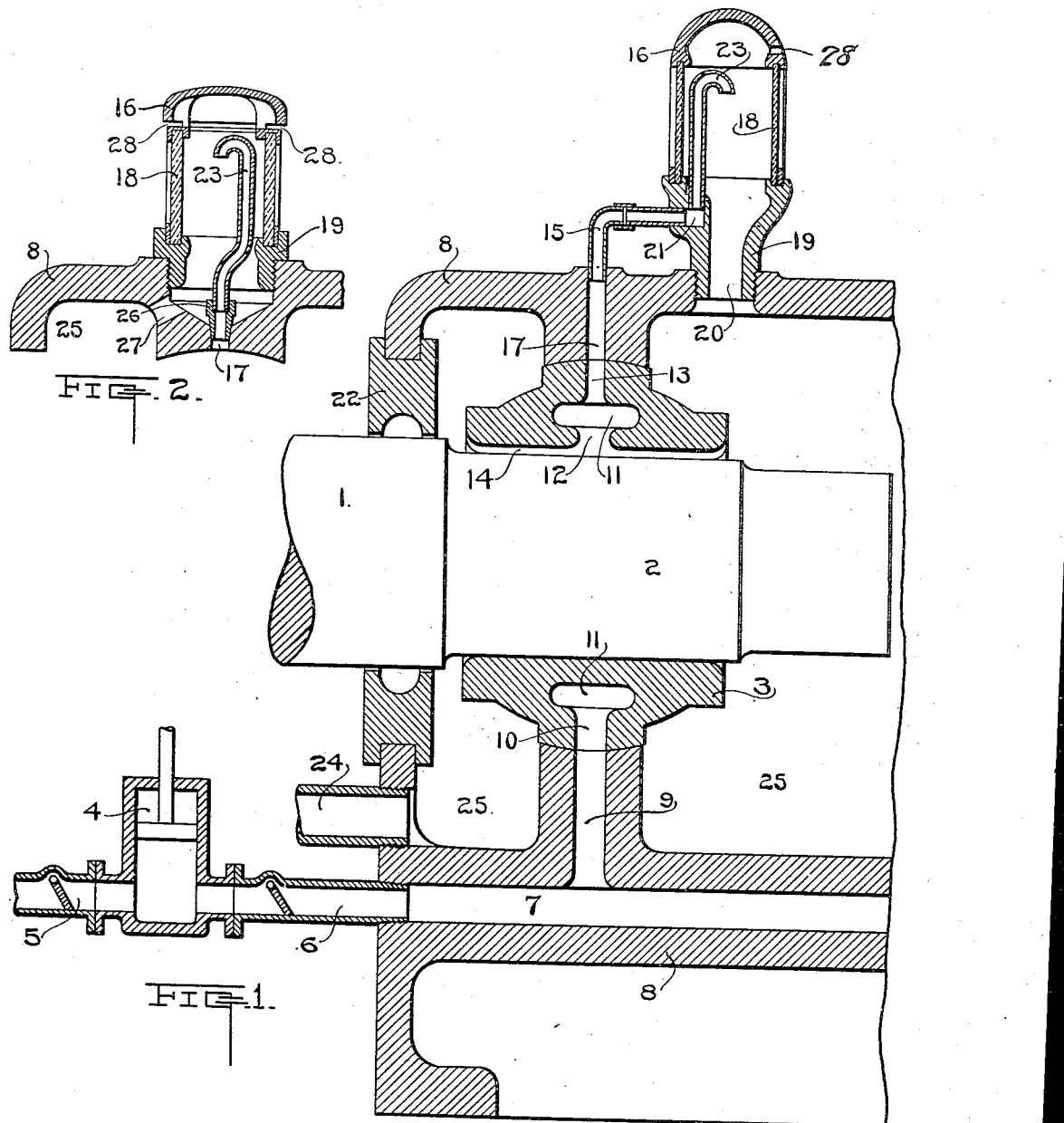

ROBERT A. McKEE, OF MILWAUKEE, WISCONSIN, ASSIGNOR TO ALLIS-CHALMERS COMPANY, OF MILWAUKEE, WISCONSIN, A CORPORATION OF NEW JERSEY.

LUBRICATING SYSTEM.

1,053,846.  Specification of Letters Patent.  Patented Feb. 18, 1913.

Application filed May 3, 1909. Serial No. 493,632.

*To all whom it may concern:*

Be it known that I, ROBERT A. MCKEE, a citizen of the United States, residing at Milwaukee, in the county of Milwaukee and State of Wisconsin, have invented a certain new and useful Improvement in Lubricating Systems, of which the following is a specification.

This invention relates to improvements in circulating systems for lubricating bearings.

The object of the invention is to provide a means whereby any cessation of flow of oil to the individual bearings can be easily detected. This is accomplished by causing part of the oil from the bearings to pass through a transparent chamber. In this way any air which may pocket at the bearing and prevent flow of oil, is vented.

A clear conception of the invention can be obtained by referring to the accompanying drawing in which like reference characters denote similar parts.

Figure 1 is a central vertical section of a casing carrying a bearing and a transparent leak-off flow detector. Fig. 2 is a similar section of a modified flow detector.

The shaft 1 passes through the gland 22 and has the reduced section 2 which bears in the shell 3. The shell 3 and gland 22 are supported by the casing 8 which forms the chamber 25.

The pipe 5 leading to a pump 4 and from thence to the pipe 6, connects with a passage 7 passing through the casing 8. A passage 9 leading from the passage 7 in a vertical direction, connects with a passage 10 in the shell 3, which in turn connects with the annular chamber 11 within the shell 3. A passage 14 in the shell 3 runs parallel with and above the shaft 1 which forms one wall of passage 14. Passage 12 in shell 3 connects the annular chamber 11 with the passage 14.

The passage 13 in the shell 3 extends vertically above the chamber 11 at its highest point and connects with a passage 17 through the casing 8. A pipe 15 connects passage 17 with a port 21 in the base 19 which has a discharge opening 20 into the chamber 25 in the casing 8. A vertical return pipe 23 connects with the port 21 at its lower end, the other end being bent downwardly and directly toward the opening 20. The base 19 is provided with a glass tube 18 upon and over which the cap 16 is drawn by being screw-threaded into base 19, thus inclosing the pipe 23 in a chamber which connects with the chamber 25 through the discharge opening 20. The chamber 25 in turn exhausts through drain 24 for removal of the oil after passing from the bearing.

In operating the device, the oil is admitted to the pump 4 through the pipe 6 into the passage 7. From the passage 7 a part of the oil is forced up through the passages 9, 10, to the annular space 11 about the shaft. The greater part of the oil leaves the space 11 through passages 12, 14, passes along the shaft 2, and is thus distributed to oil the bearing. The oil in space 11 which is not discharged in this way, is forced up the passages 13, 17, through the pipe 15, the port 21 and the pipe 23. Upon leaving pipe 23 it is precipitated as a leak-off flow through the discharge opening 20 into the channel 25. During precipitation the flow can be observed through the glass 18. As the oil from pipe 23 and passage 14 drops to the bottom of chamber 25 in casing 8, it is drawn off through the drain 24. A flow of oil at pipe 23 indicates that the bearing is being properly lubricated, while no flow at that point, or frothy flow, indicates lack of oil supply to the bearing or heating at the bearing with consequent generation of gases.

A modification of this device is made possible by making the inlet and outlet ports in the casing 8 concentric by counterboring passage 17 to form the recess for receiving the lower screw threaded end of base 19. A nipple 26 is provided to screw into the upper end of the passage 17 at the bottom of the counterbore and pipe 23 is fixed into the upper end of the nipple instead of being attached within base 19. The pipe 23 is then bent aside, then upright and then reversely bent at the top to deliver downwardly as before. The lower and upper ends of the pipe are in line and both terminate downwardly. A downwardly inclined passage 27 is formed to lead from the counterbore into the chamber 25 of the casing 8 to serve as a drain.

Vents 28 are formed in the cap 16 above the transparent tube 18 and these take the place of the separate vents which have to be provided to exhaust any gases that may be formed in chamber 25 of casing 8.

It should be understood that it is not desired to be limited to the exact details of construction shown and described, for obvious modifications will occur to a person skilled in the art.

It is claimed and desired to secure by Letters Patent:

1. In a circulating lubricating system, the combination of a bearing, means for causing a continuous flow of lubricant to said bearing, means for conducting lubricant along said bearing, and a visible leak-off in communication with said conducting means at a point above said bearing.

2. In a circulating lubricating system, the combination of a bearing, means for causing a continuous flow of lubricant to said bearing, means for conducting lubricant along said bearing, and a visible leak-off in communication with said conducting means at a point near the highest portion of said bearing.

3. In a circulating lubricating system, the combination of a bearing, a passage extending along said bearing, a chamber supplying oil through said passage to said bearing, a passage leading upwardly from said chamber at its highest point and having means providing a visible leak-off flow therefrom, and means for constant supply of oil to said chamber.

4. A casing forming a chamber, a bearing in the chamber for a shaft, a device for visible leak-off from the bearing, a drain from the visible leak-off device to the chamber of said casing, and a vent in the visible leak-off device for venting the casing through the drain.

5. In a circulating lubricating system, the combination of a bearing, a chamber isolated from said bearing, a conduit from said chamber to said bearing and a second conduit connecting from the upper part of said chamber, said second conduit having a visible leak-off flow means and means for constant supply of oil to said chamber.

6. In a circulating lubricating system, the combination of a bearing, a chamber isolated from said bearing but in communication with said bearing, and means for providing a visible leak-off flow from a point near the top of said chamber.

In testimony whereof, I affix my signature in the presence of two witnesses.

ROBERT A. McKEE.

Witnesses:
G. F. DE WEIN,
H. C. CASE.

---

Copies of this patent may be obtained for five cents each, by addressing the "Commissioner of Patents, Washington, D. C."